IMPELLER DEVICES FOR IMPLEMENTS

Filed May 24, 1967 12 Sheets-Sheet 2

Aug. 18, 1970 J. T. FRANEK ET AL 3,524,339

IMPELLER DEVICES FOR IMPLEMENTS

Filed May 24, 1967 12 Sheets-Sheet 4

Aug. 18, 1970 J. T. FRANEK ET AL 3,524,339

IMPELLER DEVICES FOR IMPLEMENTS

Filed May 24, 1967 12 Sheets-Sheet 6

Aug. 18, 1970 J. T. FRANEK ET AL 3,524,339

IMPELLER DEVICES FOR IMPLEMENTS

Filed May 24, 1967 12 Sheets-Sheet 9

Aug. 18, 1970 J. T. FRANEK ET AL 3,524,339

IMPELLER DEVICES FOR IMPLEMENTS

Filed May 24, 1967 12 Sheets-Sheet 10

United States Patent Office 3,524,339

Patented Aug. 18, 1970

3,524,339

IMPELLER DEVICES FOR IMPLEMENTS

Jozef Tadeusz Franek, Cadeleigh, and Brian Grinsted, Pinner, England, assignors to The Metal Box Company Limited London, England, a British company Filed May 24, 1967, Ser. No. 641,032
Claims priority, application Great Britain, May 25, 1966
23,373/66
Int. Cl. B21j 7/00
U.S. Cl. 72—435 11 Claims

ABSTRACT OF THE DISCLOSURE

A tool holding structure for punching, stamping, embossing, rivetting or forming tools requiring high impact velocity. The tool shank is engaged with the center portions of a pair of flexure strips whose ends are clamped in hydraulically or pneumatically actuable jaws. Normal condition of the strips is such as to bias the tool toward the work. Actuation counter-flexes the strips, withdrawing the tool from the work, whereafter triggering the release allows the elastic strips to snap the tool against the work with a high velocity, resultant upon release of the stored elactic energy of the flexed strips.

Figure 1:
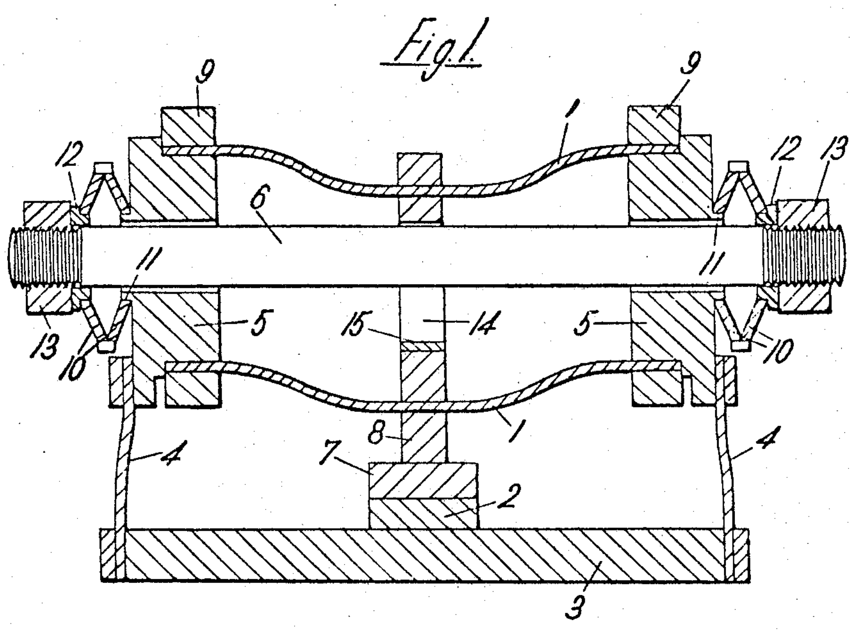

This invention relates to a method of and a device for impelling at a high velocity an implement such as a hammer, a stamping tool, a blanking tool, an embossing tool, a scoring tool, a forming tool, or an impact extrusion tool, or a rivet.

Tools of the kind above mentioned can be impelled in a number of ways, for example, in a crank press in which the kinetic energy required is stored in a fly-wheel and released during a work cycle. With such a press the flywheel slows down during the working part of the cycle but recovers its speed during the idling part of the cycle.

An alternative form of machine is a hydraulic press in which case the energy required is stored in large vessels in which the fluid is under high pressure. In such machines a pump is usually employed to keep up the volume of fluid in a vessel and the fluid is used up as necessary during the working strokes of the machine.

In other forming devices thermal energy is usually stored in a fuel which after combustion is converted into mechanical energy by expanding gases pressing on a piston.

Devices are also known, particularly for nailing or rivetting, in which explosives are employed to create the necessary energy and in such devices the energy stored in the fuel creates, during explosion, compression waves which perform the necessary work.

High energy rate techniques are also known involving a sudden release of compressed gas driving two opposite rams which attain high velocity.

Of the five known methods just mentioned the first and third are suitable for high speed production but the second and fourth have only limited uses.

It is also known that the operations of metal-forming, reforming, and stylizing can be performed by electrohydraulic devices of high energy rate which involve discharge of an electric charge inside the liquid. The disadvantages of such devices usually lie in the considerable cost thereof, the short life of condensers employed therewith, and the difficulties connected with high voltage installations.

In some instances it is advantageous to perform work at a high rate and it is a main object of the present invention to provide a method of performing work at a high rate and high speed and which is not subject to the disadvantages of the known devices, and a device for using the method.

According to the invention there is provided a method of impelling an implement consisting of the steps of associating the implement with a flexure strip substantially mid-way between the ends of the strip, deflecting the flexure strip within the elastic limit thereof by applying pressure to the opposite ends of the strip, cocking the strip by reversing the direction of deflection, and applying to the cocked strip a triggering force which causes the strip rapidly to resume the uncocked condition thereof and to impart movement to the implement at a high velocity.

According to one aspect of the invention there is provided an impeller device for an implement comprising a flexure strip deflected within the elastic limit thereof by adjustable pressure-applying means operative against the ends of the strip and actuating means operable to cock the strip by reversing the direction of deflection and to trigger the cocked strip by applying thereto a force operable to cause the strip rapidly to resume the uncocked condition thereof thereby to impel at a high velocity an implement associated with the strip substantially midway between the ends of the strip. The flexure strip may be a transverse strip the ends of which are secured to stems each movable lengthwise in a direction at right angles to a tie bolt and mounted substantially mid-way between the ends of a pair of flexure strips disposed on opposite sides of the tie bolt, said pair of flexure strips having the ends thereof secured to side frame members spaced apart axially of the tie bolt to be movable axially relative to the tie bolt, and the pressure-applying means may be mounted on the tie bolts and co-operate with the side frame members to apply pressure to the opposite ends of the pairs of flexure strips to deflect the strips of a pair in like directions within the elastic limits of the strips, the opposed strips of one pair being deflected in a direction opposite that of the other pair.

According to another aspect of the invention there is provided an impeller device comprising a first metal working tool mounted on a fixed base connected by deformable strips with side frame members spaced apart axially of a tie bolt to be movable axially relative to the tie bolt, a second metal working tool co-operable with the first tool and mounted on a stem movable lengthwise in a direction at right angles to the tie bolt by flexure strips disposed on opposite sides of the tie bolt and having the ends thereof secured to the side frame members, adjustable pressure-applying means mounted on the tie bar and co-operating with the side frame members to apply pressure to the opposite ends of the flexure strips in a manner such that the strips are deflected in like directions within the elastic limits of the strips, and actuating means operable to cock the flexure strips by reversing the direction of deflection and to trigger the cocked strips by applying to the strips a force operable to cause the strips rapidly to resume the uncocked condition thereof thereby to impel the second tool into co-operation with the first tool at a high velocity.

The pressure-applying device may comprise springs and the pressure may be applied to each end of the flexure strip or strips by at least one pair of dished disc springs.

The actuating means may comprise a rotatable eccentric having a strap which carries a pin located in a slot extending lengthwise of said stem, said pin being operable by engagement with an end of the slot to effect cocking of the flexure strips and by engagement with the other end of said slot to apply force to one of said strips to effect triggering of both strips, the arrangement being such that when the cocked strips are triggered the pin remains located between the ends of the slot. A stop movable with the stem may be arranged to co-operate with the tie bolt to prevent excessive deflection and possible failure of the flexure strips if the tool is inadvertently omitted. The cocking position may be determined by stops respectively movable with the stem or stems and stationary but adjustable on stationary frame elements. Adjustment of the strips can be effected to allow sufficient reverse deflection to prevent accidental triggering by externally applied shocks. The stationary frame elements may support for rotation a shaft with which the eccentric is rotatable.

The flexure strip, or each flexure strip, may be a laminated spring strip.

Figure 2:
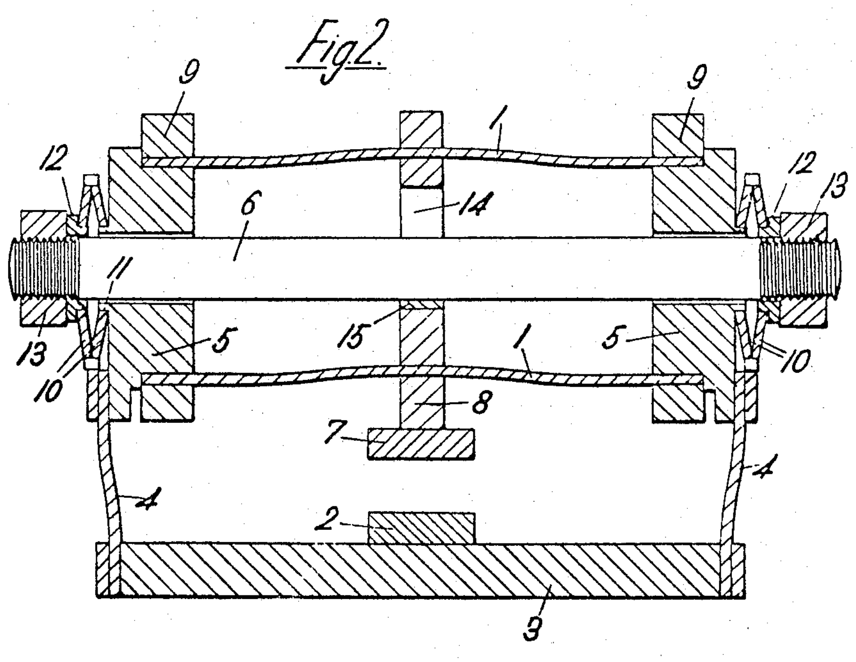
Figures 3A, 3B, 3C:
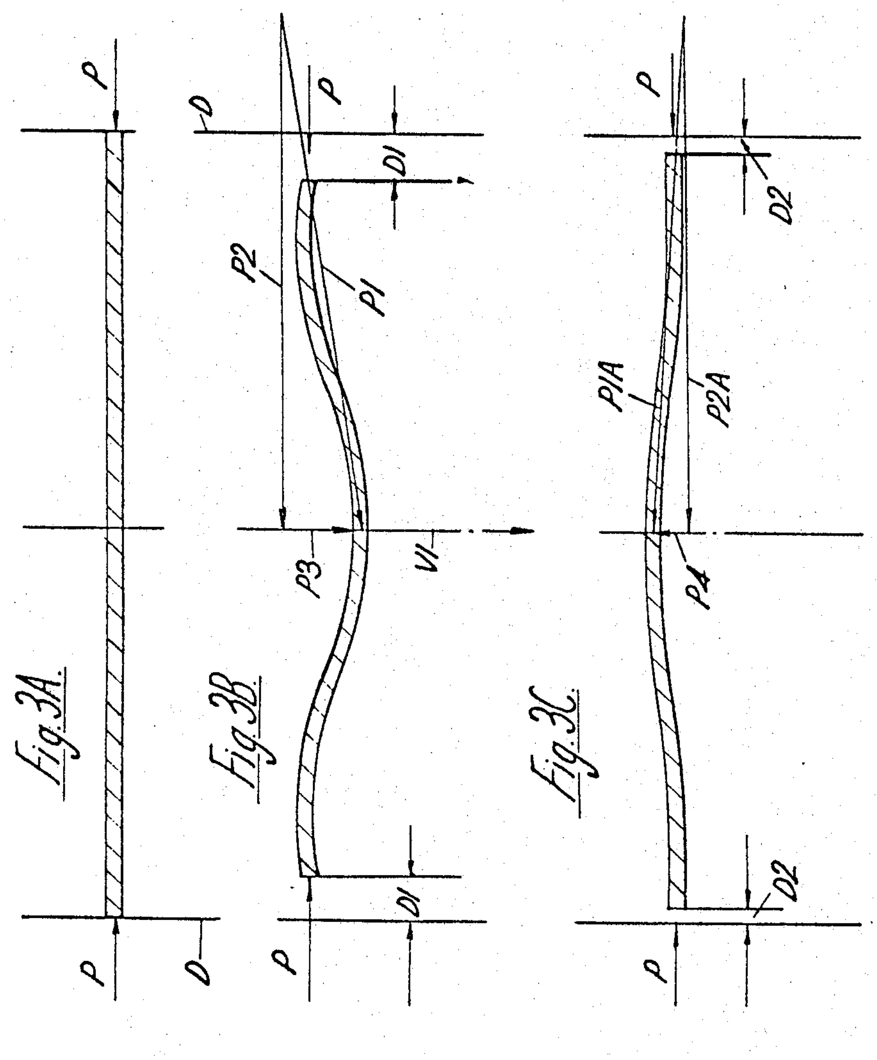
Figure 4:
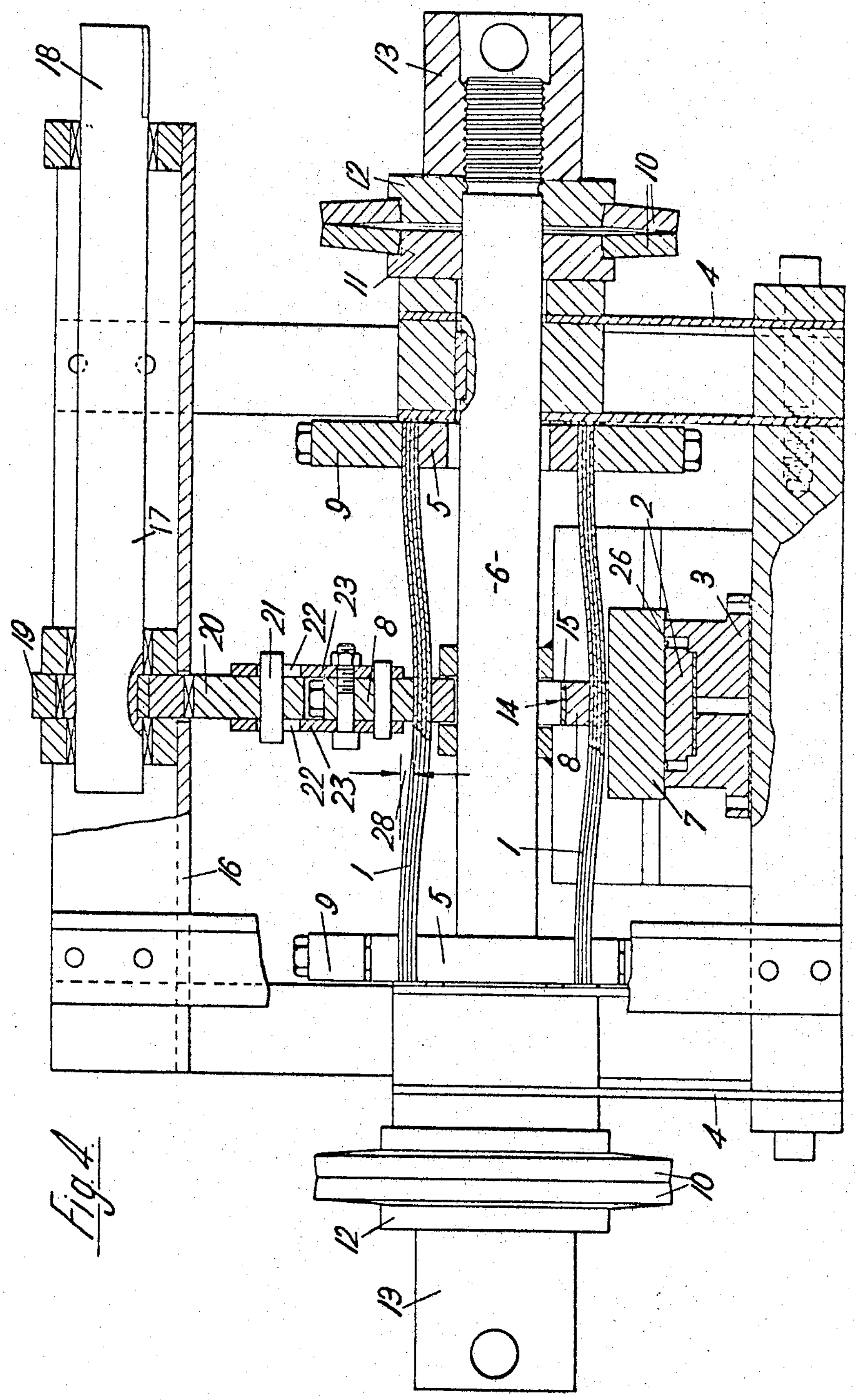
Figure 5:
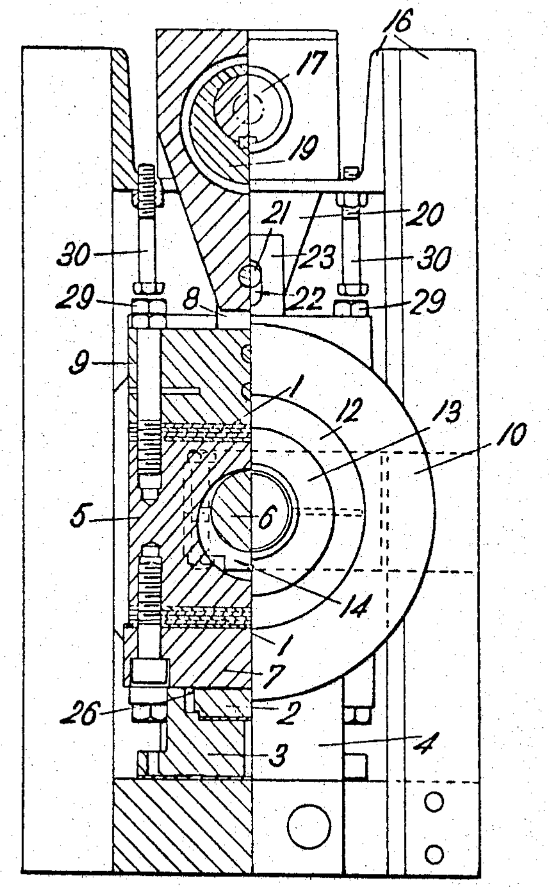
Figure 6:
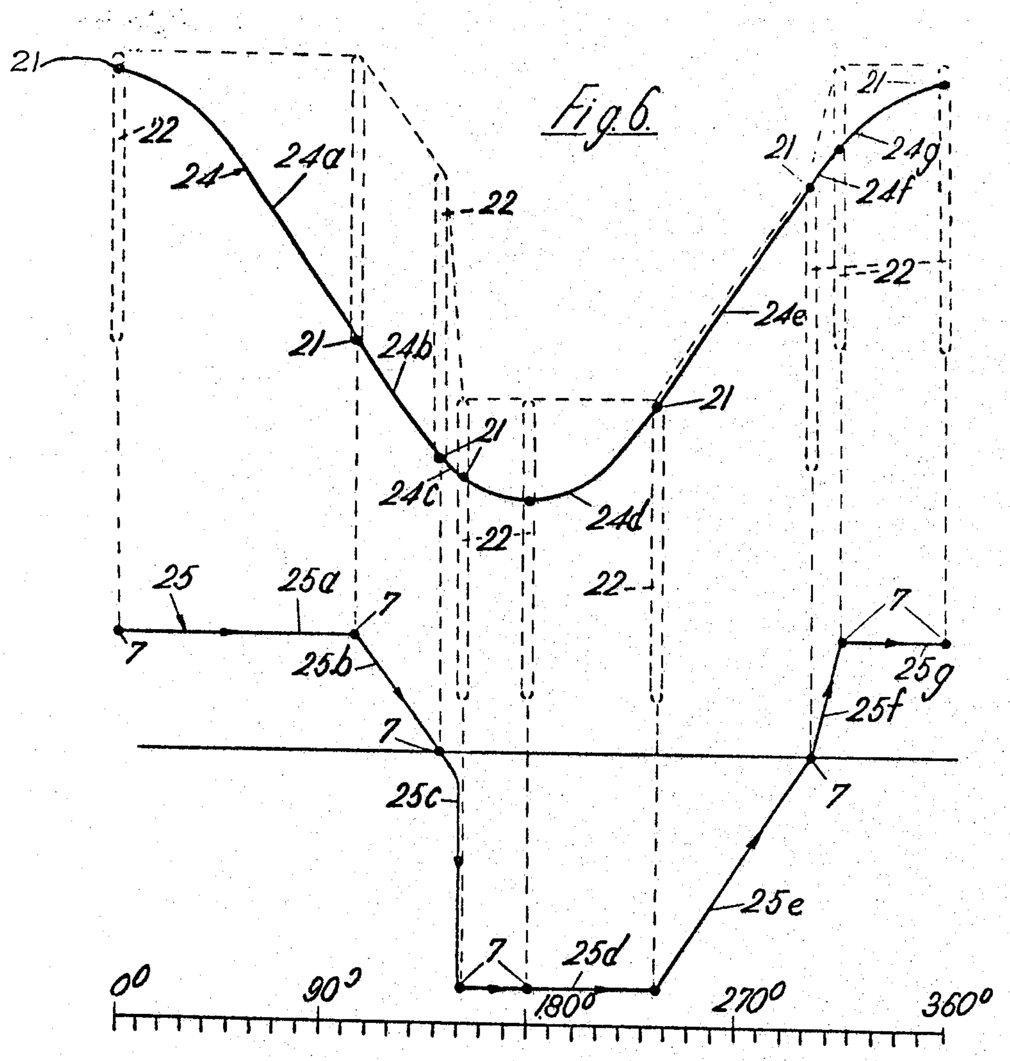
Figure 7:
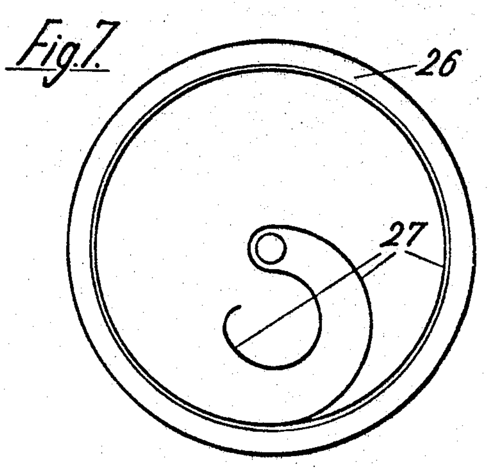

In order that the invention may be clearly understood embodiments thereof will now be described, by way of example, with reference to the drawings, in which:

FIG. 1 diagrammatically illustrates a device according to the invention in the triggered condition thereof, FIG. 2 diagrammatically illustrates the device in the cocked condition, FIGS. 3A, 3B and 3C are force and velocity diagrams of the device, FIG. 4 is a front elevation, partly in section of a device according to the invention, FIG. 5 is an end view, partly in section, of FIG. 4, FIG. 6 is a timing diagram of the apparatus shown in FIGS. 4 and 5, FIG. 7 is a plan of a can end scored by a device as illustrated in FIGS. 4 and 5, FIGS. 8, 9 and 10 diagrammatically illustrate modified forms of the device according to the invention.

Figure 11:
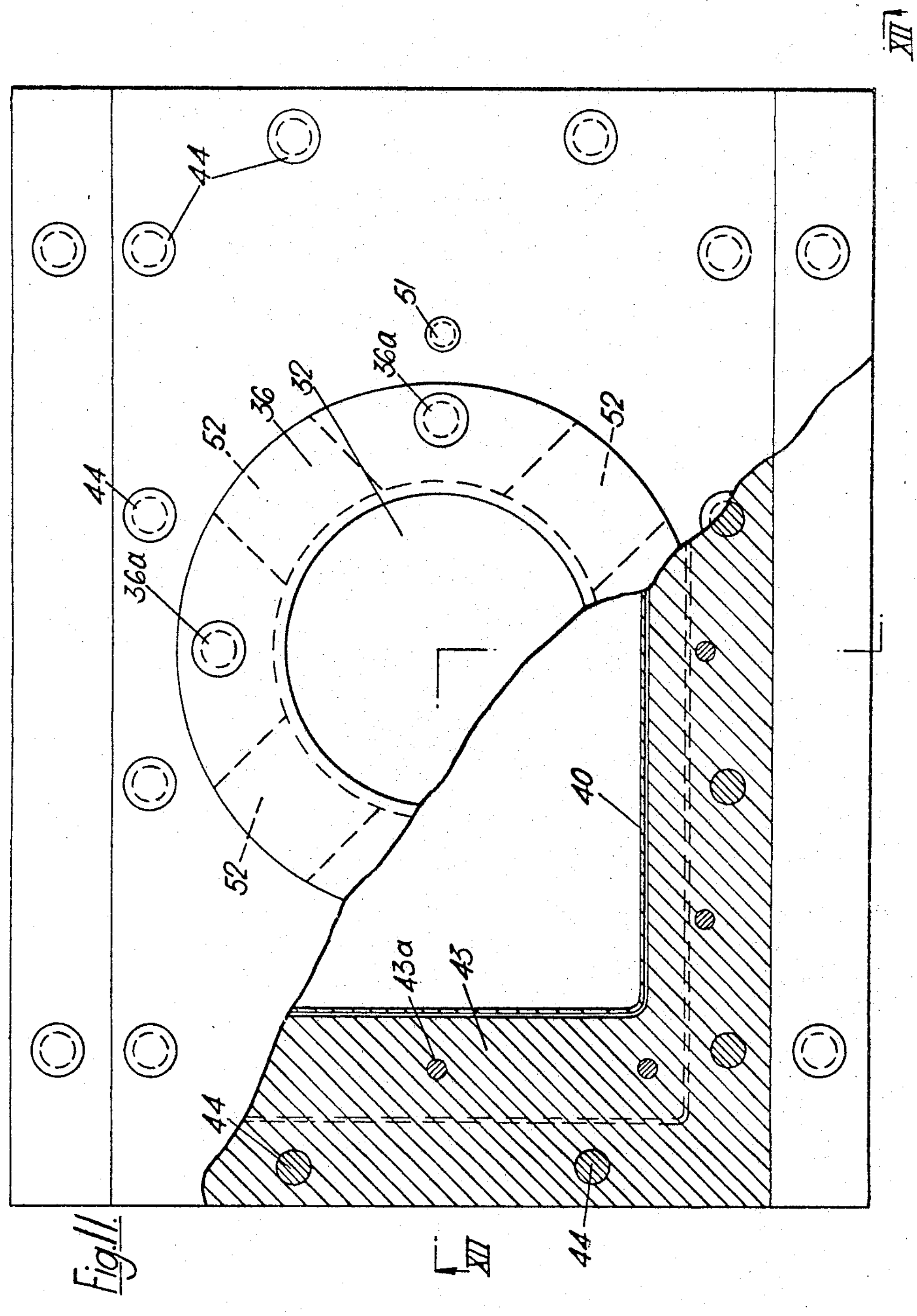
Figure 12:
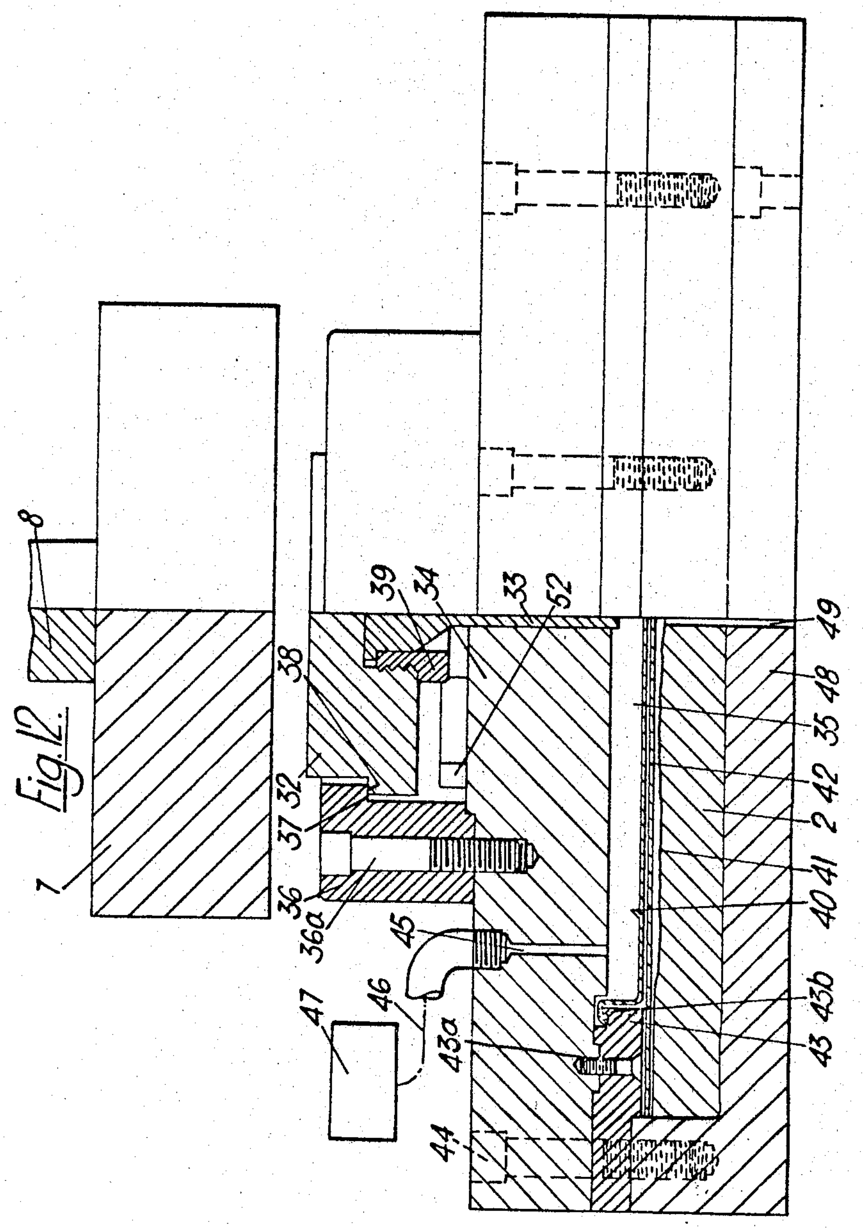
Figure 13:
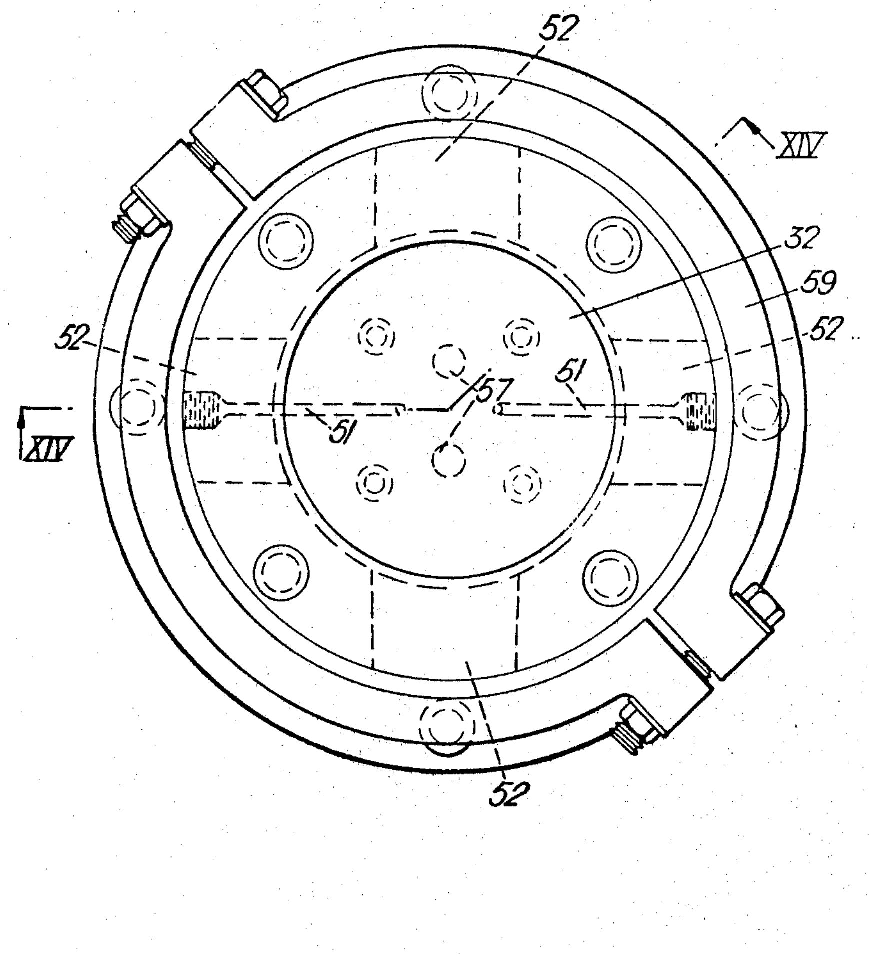
Figure 14:
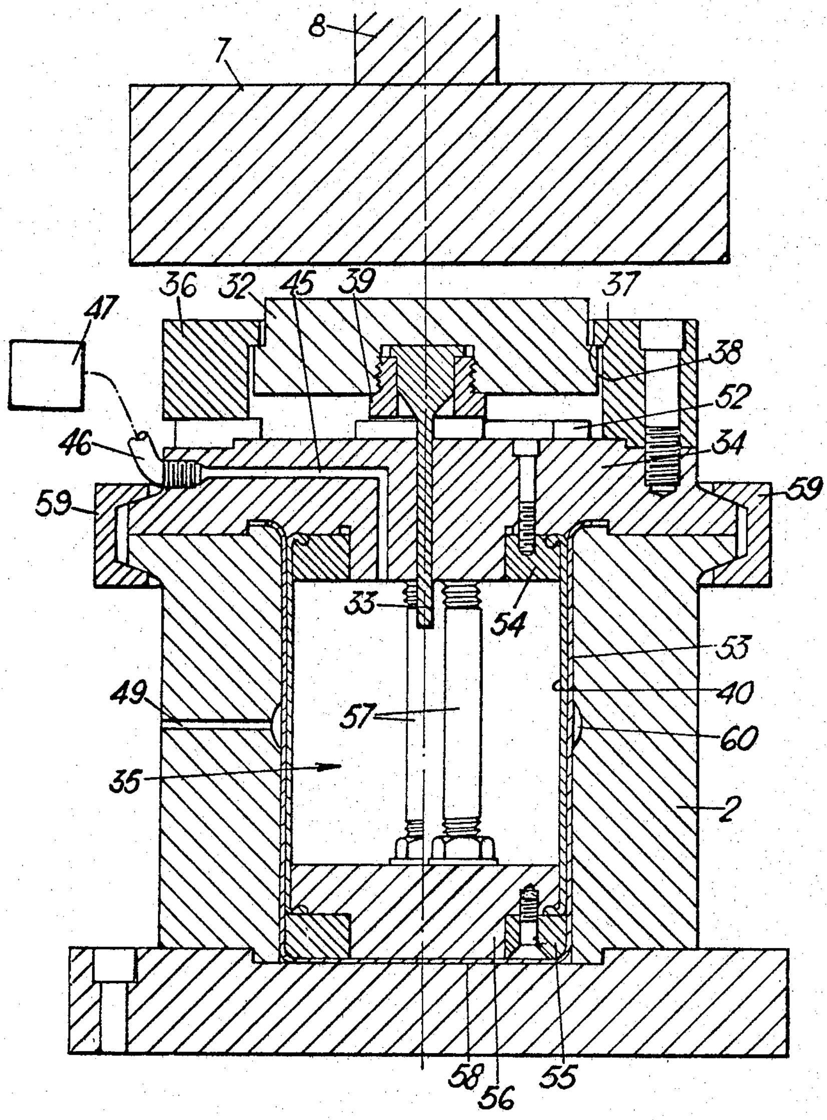

And with reference to the accompanying drawings, in which:

FIG. 11 is a top plan, partly in section, of apparatus for embossing a metal body blank, FIG. 12 is a view on line XII—XII, FIG. 11, FIG. 13 is a top plan of apparatus for re-shaping a metal can body, and FIG. 14 is a section on line XIV—XIV, FIG. 13.

In the drawings like reference numerals refer to like or similar parts.

The device according to the invention, in the widest aspect thereof, consists of a flexure strip 1 deflected within the elastic limit thereof by pressure-applying means, described below, operative continuously against the ends of the strip, and actuating means, also described below, to cock the strip by reversing the direction of deflection and increasing the pressure applied by the pressure-applying means and to trigger the cocked strip by applying thereto a force operable to cause the strip rapidly to resume the uncocked condition thereof thereby to impel at a high velocity an implement associated with the strip substantially mid-way between the ends of the strip.

As shown in FIGS. 1 and 2 a first metal working tool 2 is mounted on a fixed base 3 and is connected by deformable strips 4, preferably made of spring steel, with side frame members 5 spaced apart axially of a tie bolt 6 to be movable axially relative to the tie bolt 6. A second metal working tool 7 co-operable with the first tool 2 is mounted on a stem 8 movable lengthwise in a direction at right angles to the tie bolt 6 by the two flexure strips 1 disposed on opposite sides of the tie bolt 6 and having the ends thereof secured to the side frame members 5, as by clamping elements 9.

The pressure-applying means are of a kind which permits adjustment of the pressure applied thereby to the ends of the flexure strips 1 and may be pneumatic or hydraulic means. As shown in the drawings, however, each pressure-applying means consists of a pair of dished disc springs 10 the dished sides of which face one another. The springs 10 are located respectively by shoulders 11 on the side frame members 5 and by stepped sleeves 12 free on the tie bolt 6, and nuts 13 are screwed onto the ends of the tie bolt to permit adjustment of the pressure applied by the springs 10. When the device is prepared for use the nuts 13 are turned until the springs 10 apply a force to the ends of the strips 1 exceeding by two to three times the value given by Euler's formula which gives the maximum axial load the strips are able to support as a straight strut. It is to be understood that for purposes of illustration the extent of the axial end movement of the flexure strips has been exaggerated. As can be seen from the drawings, the tie rod 6 passes through a slot 14 which extends lengthwise of the stem 8 and, as shown in FIG. 1, when the strips are in the triggered, or uncocked, condition, and the tools 2 and 7 are co-operating with each other, the tie rod 6 does not engage an end of the slot 14.

When the strips 1 are cocked by actuating means as described below, the stem 8 is moved lengthwise, upwards as viewed in FIG. 1, until a stop 15 in slot 14 engages the tie rod 6 at which time the direction of deflection of the strips has been reversed, the side frame members have been moved apart axially of the rod 6, and the springs 10 have been further compressed. Each flexure spring 10 is, therefore, in effect a toggle linkage and when a triggering force is applied to the cocked strips, as described below, the strips are moved past the dead centre positions thereof and the energy stored in the disc springs 10 during the charging of the device is suddenly dissipated so that the strips 1 rapidly return to the pre-set uncocked condition thereof and the tool 7 is moved into co-operation with tool 2 at a high velocity. The tool 7 is maintained in the aligned condition thereof with respect to tool 2 by deflection or deformation of the strips 4 as indicated in FIGS. 1 and 2. The stop 15 is arranged, by co-operation with the tie bolt 6, to provide sufficient reverse deflection in the cocked position to prevent accidental triggering from externally applied shocks.

FIGS. 3A, 3B and 3C are a force and velocity diagram from which it will be seen that starting from the straight uncompressed condition thereof, FIG. 3A, forces P applied to the ends of the strip by adjustment of the springs 10 apply to the strip endwise compressive forces P1, charging forces P2, and an accelerating force P3, the end frame members being moved by a distance D1 from datum position D, FIG. 3B. When the strip is cocked the compressive force is along line P1A, the charging force is along line P2A, the accelerating force becomes a cocking force P4, and the distance of the end frame members from the datum positions D is reduced to D2, FIG. 3C, thus increasing the compression of the springs 10. The velocity of the tool 7 is shown by line VI, FIG. 3B.

FIGS. 4 and 5 illustrate an embodiment of the invention described above with referesce to FIGS. 1, 2, 3A, 3B and 3C and include the actuating means above-referred to. The impelling device is supported by fixed frame elements 16 to which the base 3 is secured. The frame elements 16 also support a rotatable shaft 17 to the end 18 of which is secured a fly-wheel, not shown, by which the shaft 17 is rotated. Also secured to shaft 17 is an eccentric 19 co-operating with a strap 20 which carries a cocking and triggering pin 21 located in slots 22 provided in guide plates 23 secured to the stem 8.

FIG. 6 is a timing diagram in which the line 24 represents the stroke of the eccentric and line 25 represents the stroke of the tool 7. From the diagram it will be observed that at 0 degrees of the eccentric cycle the strip 1 is charged and the pin 20 is at the top of its stroke. During the portion *24a* the strips 1 remain cocked as shown at *25a* and are triggered during portion *24b* so that the tool 7 during portions *24c* and *25c* is moved at a high velocity into co-operation with the tool 2. During portions *24d*, *25d* the tool 7 remains in co-operation with the tool 2 and during portions *24e*, *24f*, *25e*, *25f* the strip 1 is re-cocked. Portion *24g* is an idle portion of the stroke during which the strips 1 remain cocked as indicated at *25g*.

In FIGS. 4 and 5 it is assumed that the tools 2, 7 are for effecting the scoring of a can end 26 as illustrated in FIG. 7, the scoring being indicated at 27. It is, however, to be understood that, by suitable selection and deflection of strips 1, the tools 2, 7 may be metal working tools of a kind suitable for effecting stamping, blanking, embossing, or forming, or they may be suitable for effecting impact extrusion. The can ends are fed into position on, and are removed from, the tool 2 by any suitable means, not shown, during charging of the strip 1. The cocking position is determined by stops 29, FIG. 5, movable with the stem 8 and stationary, but adjustable, stops 30 on the fixed frame elements 16.

In the apparatus illustrated in FIGS. 4 and 5 each of strips 1 consists of a laminated spring steel strip having four laminations. Each individual strip of a lamination has a width of four inches and a thickness of 0.080 inch and before deflection or charging by the pressure-applying means has a length of 10½ inches. The extent of deflection 28, FIG. 4, is 0.300 inch and the distance through which the direction of deflection is reversed to obtain the cocking force P4, FIG. 3C, is 0.05 inch. The charging load is approximately 3 tons, the triggering or cocking load approximately ½ ton, and the energy discharge approximately 86 ft. lbs. The working stroke is completed in approximately five thousandths of a second and the tool reaches a maximum velocity of approximately 17 ft./sec. With the arrangement as just stated it is found taht the device can perform scoring at a high energy rate up to a depth of 0.010 inch.

Figure 8:
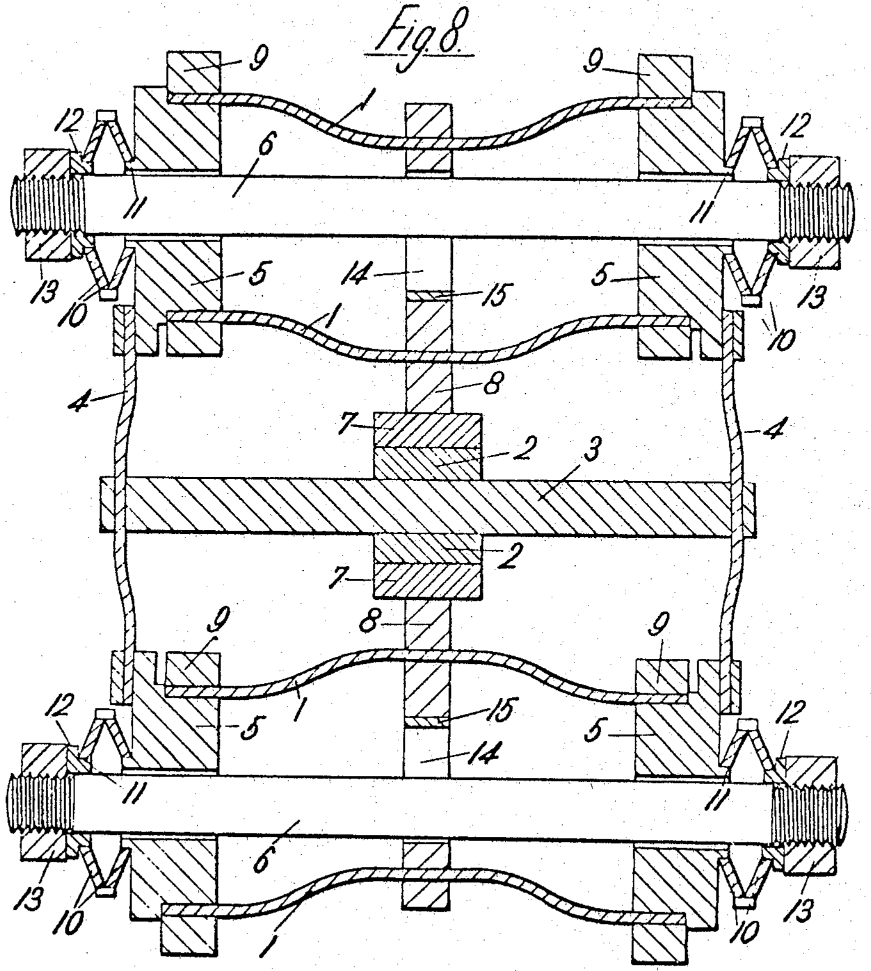

FIG. 8 illustrates diagrammatically a modified form of the apparatus which permits balancing of the basic mechanism and avoids any substantial external reactions. As can be seen from FIG. 8 the apparatus, with the exception of the base 3, is duplicated.

Figure 9:
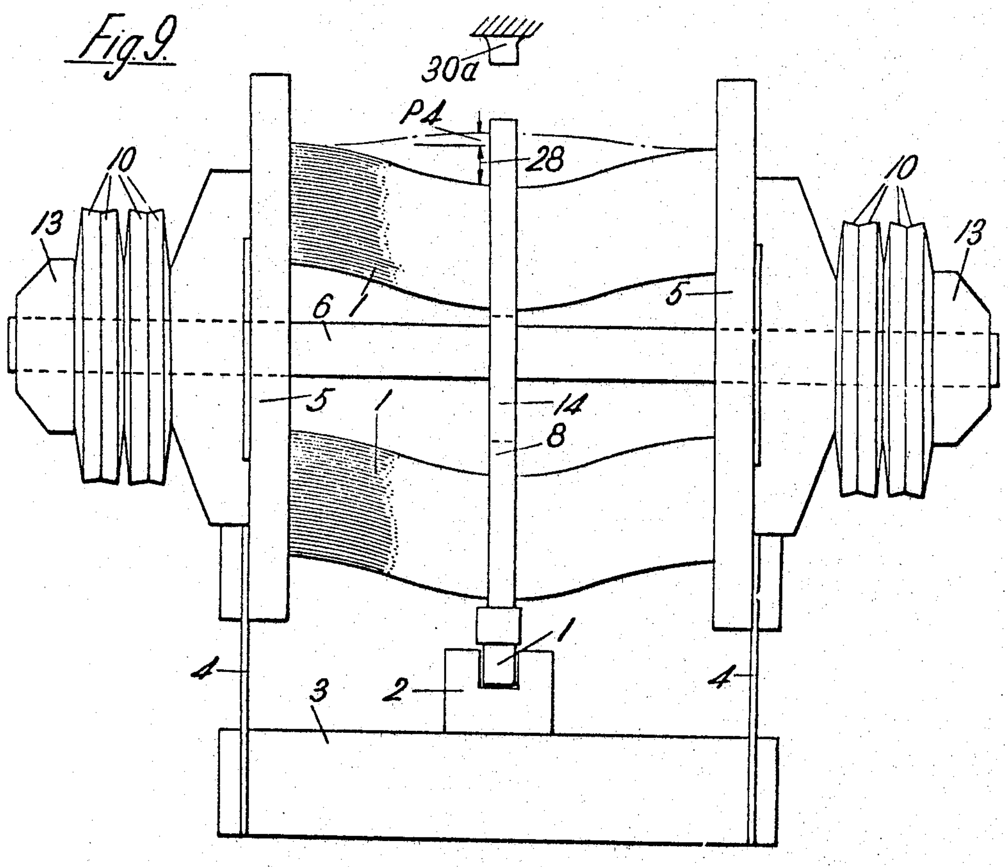

FIG. 9 diagrammatically illustrates an embodiment of the device according to the invention designed for impact extrusion of aluminium or aluminium alloys and is the equivalent of a 400 ton press. In this embodiment of the device the springs 10 are duplicated at each end of the tie bolt 6, the tool 2 is a die, the tool 7 is a plunger, and the ccoked position is determined by a stop 30*a*, preferably adjustable, engageable by a stop carried by the stem 8. Each of the flexure strips 1 consists of 90 laminations the individual strips of which are 8 inches wide and 0.080 inch thick and have an initial length of 32 inches. The extent of deflections 28 is 3 inches and the distance through which the direction of deflection is reversed to obtain the cocking force P4, FIG. 3C, is 1 inch. The charging load is approximately 45 tons and the energy discharge approximately 12,500 ft. lbs. The working stroke of 3 inches is completed in approximately 0.025 second and the tool reaches a maximum velocity of approximately 35 ft./sec.

Figure 10:
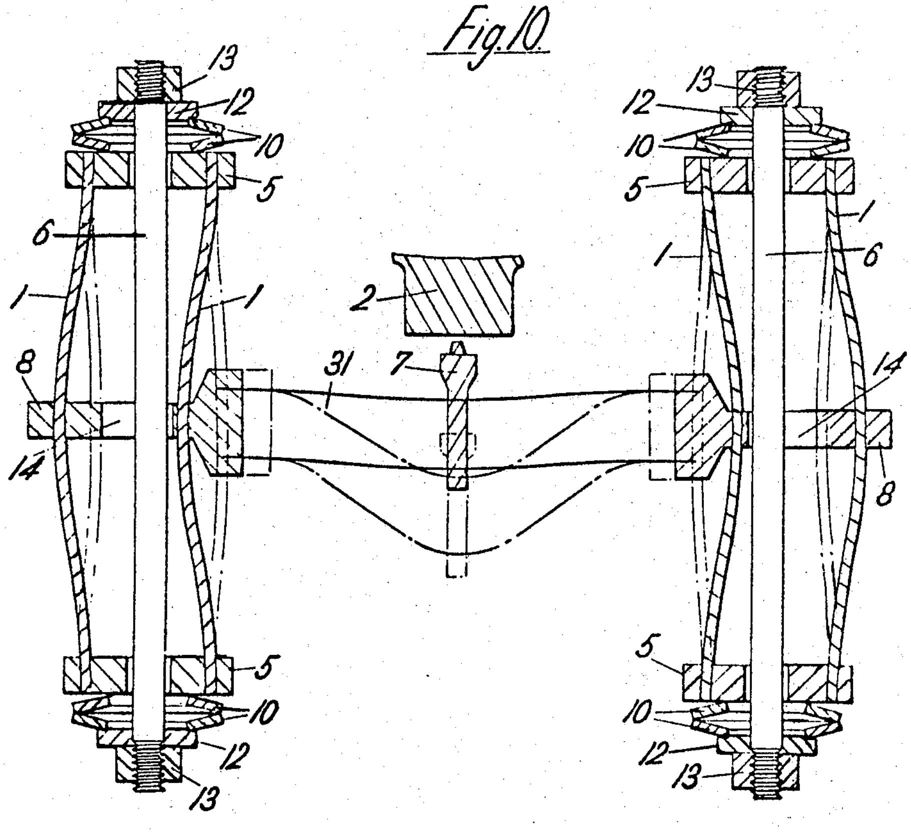

FIG. 10 diagrammatically illustrates an embodiment of the device according to the invention designed for high speed tools or for acceleration of missiles where velocity at the end of the stroke can be achieved up to 200 ft./sec. In this embodimnt of the invention the tool 7, or a missile, is impelled by transverse flexure strips 31. As can be seen from FIG. 10, the ends of transverse strips 31 are secured to stems 8 each movable lengthwise in a direction at right angles to a tie bolt 6 which is mounted substantially mid-way between the ends of a pair of flexure strips 1 disposed on opposite sides of the tie bolt 6. Each pair of strips 1 has the ends thereof secured to side frame members 5 spaced apart axially of the tie bolt 6 to be movable axially relative to the tie bolt. The pressure-applying means are as described above and consist of springs 10 which are mounted on the tie bolts and co-operate with the side frame members 5 to apply pressure to the opposite ends of the pairs of flexure strips 1 in like directions within the elastic limits of the strips. As can be seen from FIG. 10, the opposed strips 1 of one pair are deflected in a direction opposite that of the other pair.

In FIG. 10 the flexure strips 1 and 31 are shown in the uncocked positions thereof in full lines and the cocked positions are indicated by broken lines. It will be understood that in this embodiment of the device the cocking and uncocking of the transverse flexure strips 31 is a function of the cocking and uncocking of the flexure strips 1.

FIGS. 11 and 12 illustrate apparatus according to the invention for embossing a metal body blank for a can. In this form of the invention the implement 7 is a hammer and the impeller device, while not shown in these figures, 38 formed on the piston head 32. The stem 33 is retained to the stem 8. As can be seen from FIG. 12, the hammer is aligned with the head 32 of a piston having a stem 33 which is guided by a cover plate 34 for axial movement into a chamber 35 which is to contain hydraulic oil, not shown. The head 32 is located in a housing 36 secured to the cover plate 34 by bolts 36*a*. The housing 36 has a shoulder 37 for engagement with a corresponding shoulder 38 formed on the piston head 32. The steam 33 is retained in position relative to the piston head 32 by a nut 39 which also acts as a stop to determine the extent of downward movement of the stem 33 when the stop 39 engages the top of the cover plate 34.

Within the chamber 35 there is located a resilient element 40. Below the resilient element 40 is located a metal-working tool 2 which, in this instance, consists of a mould member which, in the embodiment being described, has a profile 41 arranged to emboss a metal body blank 42 located between the profile 41 and the resilient element 40. Although in FIG. 12, the blank 42 is shown as being spaced from the upper surface of the mould element 2 and from the under surface of a clamping member 43, it will be understood that when the apparatus is in the condition shown in FIG. 12, the perimeter of the blank is tightly clamped between the upper surface of the mould element 2 and the under surface of the clamping member 43. The clamping member 43 is secured to the underside of the cover plate 34 by screws 43*a* and is provided with a groove 43*b* in which the edge portions of the resilient element 40 are located for clamping between the clamping member 43 and the underside of the cover plate 34. When assembled, as shown in the drawing, the various parts are secured in position by bolts 44 and when this is done the blank 42 and the resilient element 40 are clamped in position by co-operation between the clamping member 43 and the mould element 2 and cover plate 34 respectively.

The cover plate 34 is provided with an oil inlet 45, FIG. 12, which is connected by a pipe 46 with a hydraulic pump 47, and the mould element 2 and the base member 48 by which it is supported are provided with a venting aperture 49.

Although for the purposes of illustration the cover plate 34, clamping member 43, mould element 2, and base member 48 have been illustrated as being clamped together by bolts 44, it will be understood that in an apparatus for operating at high speeds the bolts 44 would be replaced by suitable automatically operable clamping elements permitting the rapid separation of the cover plate 34 and clamping member 43, together with the resilient element 40, from the remainder of the apparatus so as to permit the insertion of blanks into the apparatus and the removal thereof from the apparatus following the embossing operation.

In operation when a blank 42 has been clamped in the apparatus the hydraulic pump 47 admits oil to the chamber 35 and creates therein a predetermined pressure, for example a pressure of about 1,000 p.s.i. which is sufficient to deform the blank 42 against the profile 41 of the mould element 2 and to expel air from between the blank and the profile through the venting aperture 49. At this time the hammer 7 is in the cocked position thereof and following the creation of the desired pressure in the chamber 35 the flexure strips 1 are triggered so that the hammer 7 is impelled with a high velocity against the head 32 thus causing the stem 33 to be pushed into the oil in the chamber 35 at a very high velocity, which velocity will, of course, depend on the design proportions of the apparatus. The sudden increase of pressure effected in the oil is transmitted through the flexible element 40 to the blank 42 and so effects the embossing of the blank against the profile of the mould element 2. The flexure strips 1 are then re-cocked and the hydraulic pressure is relieved permitting the cover plate 34 and clamping member 43, together with resilient element 40, to be removed so that the embossed blank can be removed from the apparatus. The stem 33 and the piston head 32 will be restored to the position thereof shown in FIG. 12 when the hydraulic pressure is again built up in the chamber by the pump 47. A bleed hole 51, FIG. 11, is provided in the cover plate 34 and communicates with the chamber 35. Ducts 52 are provided in the housing 36 to permit the exit of oil which may seep past the stem 33.

FIGS. 13 and 14 illustrate a modified form of the apparatus described with reference to FIGS. 11 and 12 and which is adapted for reshaping a metal can body 53. In this embodiment of the invention the resilient element 40 is held in position between collars 54, 55, the collar 54 being secured to the cover plate 34 and the collar 55 being secured to a pad 56, the pad 56 being in turn secured to the cover plate 34 by bolts 57 which, together with the pad 56, are arranged to take the load on the bottom 58 of the can body 53. In this instance the mould member 2 is a split mould, the halves of which are retained in position by clamping members 59 which are suitably constructed to withstand the very high forces which are involved during the rapid discharge of energy.

The mould element 2 is designed to form an external bead on the can body and to this end is provided with an annular groove 60. The mode of operation of the apparatus is similar to that described above with reference to FIGS. 11 and 12.

It is found that by suitably designing the forms of apparatus described with reference to FIGS. 11 and 12, and 13 and 14, one can obtain a high speed of operation of up to about 150 blanks or containers per minute.

The use of potential energy which is stored in the springs 10 and the flexure elements 1 ensures safe operation of the apparatus and the life of the apparatus is long because the apparatus is based on purely mechanical components. The only element which may deteriorate is the resilient element 40 which transfers the work to the work-piece and it will be readily appreciated that the resilient element is easily replaceable. It is found that, depending upon the design proportions of the apparatus described with reference to FIGS. 11 and 12 and 13 and 14, the pressures involved during the work stroke, that is during the forward movement of the stem 33, may be in the region of 100,000 p.s.i.

From the foregoing description it will be understood that the device according to the invention is based on the principle of toggles the links of which are replaced by the flexure strips 1, or by 1 and 31, that by reason of the novel construction it is possible to store mechanical energy without the previous conversion from thermal energy, and that the stored mechanical energy can be directly converted into kinetic energy which in turn performs work at a high rate.

It will also be understood that although the device contains working parts under considerable loads there are no bearings between the highly loaded working parts, there are no slides involved and, therefore, friction losses are caused only by the internal friction within the material, hence wear is avoided and no lubrication is necessary.

The device also has the advantages of a linear and parallel movement of the tool 7 with very good stability, work done can be controlled simply by adjustment of the cocking force and of the working stroke, and problems of frame deflection are avoided.

A further advantage of the device is that it is possible to achieve complete control of cycle speed and within the cycle to provide an extremely high response of the mechanism with triggering and charging so that high output speeds can be achieved.

Still further advantages of the device are that it is simple so that manufacturing costs may be low, the highly stressed components require minimum machining, and the work of assembly does not involve considerable precision because no bearings are involved.

The device can, because of good design flexibility, replace mechanical presses, or impact forming devices which involve thermal energy. Further, the device is substantially proof against damage due to the accidental feeding thereto of double blanks, and because lubrication is not necessary problems of oil seals, leakage, and friction with inevitable wear are avoided.

As compared with that of a conventional crank press, the frame is less robust and the bearings for the shaft carrying the eccentric and the fly-wheel are much lighter, having to carry only about one-tenth of the load on the eccentric in a crank press for the same duty because the fly-wheel discharges its energy over a much greater arc during the charging stroke. The actual load in the frame and bearings is calculable and does not have to allow for overloads of unknown quantity.

It is also found that the device has little or no tendency to bounce in spite of its high rate of operation, and it has a high natural frequency so that it has a good response and is suitable for high speed operation.

What is claimed is:

1. A method of impelling an implement consisting of the steps of associating the implement with a flexure strip substantially midway between the ends of the strip, deflecting the flexure strip within the elastic limit thereof by applying pressure to the opposite ends of the strip, cocking the strip by reversing the direction of deflection, and applying to the cocked strip a triggering force which causes the strip rapidly to resume the uncocked condition thereof and to impart movement to the implement at a high velocity.

2. An impeller device for an implement comprising a flexure strip deflected within the elastic limit thereof by adjustable pressure-applying means operative against the ends of the strip, and actuating means operable to cock the strip by reversing the direction of deflection and to trigger the cocked strip by applying thereto a force operable to cause the strip rapidly to resume the uncocked condition thereof thereby to impel at a high velocity an implement associated with the strip substantially mid-way between the ends of the strip.

3. An impeller device according to claim 2, wherein said flexure strip is a first strip the ends of which are secured to stems each movable lengthwise in a direction at right angles to a pair of spaced tie bolts along a line substantially mid-way between the ends of other flexure strips disposed in pairs transverse to said first strip, each pair of said other strips being disposed on opposite sides of one of said tie bolts, each said stem being secured to one said pair of said other strips, said pairs of flexure strips having ends thereof secured to side frame members spaced apart and movable exially of said tie bolts, and wherein said pressure-applying means include means mounted on said tie bolts and associated with said side frame members for applying pressure to the opposite ends of said pairs of other flexure strips to deflect the strips of a first one of said pairs in like direction and to deflect the strips of the other one of said pairs in a direction opposite to that of said first pair, within the elastic limits of said other strips, whereby to effect deflection of said first strip.

4. An impeller device comprising a first metal working tool mounted on a fixed base connected by deformable strips with side frame members spaced apart axially of a tie bolt to be movable axially relative to said tie bolt, a second metal working tool co-operable with said first tool and mounted on a stem movable lengthwise in a direction at right angles to said tie bolt by flexure strips disposed on opposite sides of said tie bolt and having the ends thereof secured to said side frame members, adjustable pressure-applying means mounted on said tie bolt and co-operating with said side frame members to apply pressure to the opposite ends of said flexure strips in a a manner such that said flexure strips are deflected in like directions within the elastic limits of said flexure strips, and actuating means operable to cock said flexure strips by slightly reversing the direction of deflection and to trigger the cocked flexure strips by applying thereto a force operable to cause said flexure strips rapidly to resume the uncocked condition thereof, thereby to impel said second tool into co-operation with said first tool at a high velocity.

5. An impeller device according to claim 4, wherein said pressure-applying means comprises springs.

6. An impeller device according to claim 5, wherein said pressure is applied to each end of said flexure strip or strips by at least one pair of dished disc springs the dished sides of which face one another.

7. An impeller device according to claim 4, wherein said actuating means comprises a rotatable eccentric having a strap which carries a pin located in a slot extending lengthwise of said stem, said pin being operable by engagement with one end of said slot to effect cocking of said flexure strips and by engagement with the other end of said slot to apply force to said stem and thereby upon one of said strips to effect triggering of both strips, the arrangement being such that when the cocked strips are triggered the pin remains located between the ends of said slot.

8. An impeller device according to claim 4, wherein the force applied to the ends of the flexure strip or strips exceeds by two to three times the value given by Euler's formula for the maximum axial load the strip or strips is or are able to support as a straight strut.

9. An impeller device according to claim 7, wherein the cocking positions of said flexure strips are determined by stops respectively movable with said stem and stationary but adjustable on stationary frame elements.

10. An impeller device according to claim 9, wherein said stationary frame elements support for rotation a shaft with which said eccentric is rotatable.

11. An impeller device according to claim 4, wherein each flexure strip is a laminated spring strip.

References Cited

UNITED STATES PATENTS

| | | | |
|---|---|---|---|
| 52,894 | 2/1866 | Shaw | 72—435 |
| 74,068 | 2/1868 | Fischer | 72—451 |
| 1,003,497 | 9/1911 | Optenberg | 72—451 |

FOREIGN PATENTS

| | | |
|---|---|---|
| 693,958 | 7/1953 | Great Britain. |

CHARLES W. LANHAM, Primary Examiner
G. P. CROSBY, Assistant Examiner

U.S. Cl. X.R.

72—445